United States Patent Office 3,542,902
Patented Nov. 24, 1970

3,542,902
HYDROLYZED ETHYLENE/VINYL ESTER COPOLYMER-EPOXY RESIN BLENDS
Paul F. Dunion, Jr., and Akira Tsukamoto, Wilmington, Del., assignors to E. I. du Pont de Nemours and Company, Wilmington, Del., a corporation of Delaware
No Drawing. Filed June 28, 1968, Ser. No. 740,984
Int. Cl. C08g 45/04
U.S. Cl. 260—836
10 Claims

ABSTRACT OF THE DISCLOSURE

Compositions are disclosed which contain a compatible blend of (A) a hydrolyzed ethylene/vinyl ester copolymer, e.g., ethylene/vinyl acetate, containing 10–70 mole percent vinyl alcohol and (B) an epoxy resin. After curing, the compositions possess the combination of good adhesive and good bulk properties.

BACKGROUND OF THE INVENTION

As illustrated by U.S. Pat. 2,386,347 issued to John R. Roland, hydrolyzed copolymers of ethylene and a vinyl ester have been known for some time. However, it has only been comparatively recently that their particular utility in structural adhesive applications has been widely appreciated, especially in combination with metal surfaces.

While the hydrolyzed copolymers are generally useful in the structural adhesive area, there are certain applications which are particularly demanding and it would be very desirable if some of the properties of the hydrolyzed copolymers could be enhanced. Thus, an adhesive possessing the good adhesive properties exhibited by the hydrolyzed copolymers which also possess good bulk properties with respect to dimensional stability at high temperature (e.g., creep resistance), tensile strength, elongation, and solvent resistance would find considerable utility in an increased number of structural adhesive applications. Unfortunately, previous attempts to improve one or more of the bulk properties of the hydrolyzed copolymers has generally adversely effected either the adhesive properties or one or more of the other bulk properties of the copolymers. For example, reacting the hydrolyzed copolymers with phenolic resins in order to increase their solvent and dimensional stability at high temperature tends to reduce the elongation of the copolymers beyond a useful limit.

SUMMARY OF THE INVENTION

According to the present invention there is provided a composition which not only exhibits good adhesive properties such as high peel and lap shear strengths but additionally possess good bulk properties. The present composition essentially comprises a compatible blend of (A) 70–99 weight percent of a hydrolyzed ethylene/vinyl ester copolymer containing 10–70 mole percent vinyl alcohol and (B) 1–30 weight percent of an epoxy resin.

DESCRIPTION OF THE PREFERRED EMBODIMENTS

Hydrolyzed ethylene/vinyl ester copolymers useful in the present invention are well known; their preparation being described in a number of patents among which are the aforementioned Roland patent and U.S. Pat. 3,344,-129 issued to Bestian et al. The hydrolyzed copolymers are generally obtained by reacting, in solution, a precursor ethylene/vinyl ester copolymer with an alcohol in the presence of a basic catalyst such as sodium methoxide. Other methods for preparing the hydrolyzed copolymers such as in suspension or with an acid catalyst can also be employed. Similarly, while the above patents show the reaction being accomplished with alcohol, other methods such as hydrolysis with water are also useful. With respect to the vinyl ester of the precursor ethylene/vinyl ester copolymer, vinyl acetate is preferred due to its ready availability. However, other vinyl esters such as vinyl formate, vinyl propionate, vinyl butyrate, as well as many others can also be used.

Useful hydrolyzed ethylene/vinyl ester copolymers are those which can form a compatible blend with an epoxy resin and which contain about 10–70 mole percent vinyl alcohol. The term "compatible" refers to the state of the blend after the ingredients have been intimately mixed and cast into a continuous film. Compatible blends are those which possess essentially no macro phase separation, i.e., the ingredients are blended sufficiently well so that the epoxy resin is dispersed uniformly in the blend to allow reaction with the alcohol groups of the hydrolyzed copolymer on curing. The presence of macro phase separation can usually be detected by visual examination of thin (10–50 mil) films, and is present when it is apparent that there are large areas of essentially pure hydrolyzed copolymer and/or pure epoxy resin in the film. Thin films of the compatible blends of this invention generally tend to be translucent or opaque in appearance though they can also be transparent. So long as compatibility is obtained, the adhesive and bulk properties of the compositions of the present invention are relatively insensitive to the molecular weight of the hydrolyzed ethylene/vinyl ester copolymer. This is in contrast to what is observed with respect to many of the properties of the hydrolyzed copolymers themselves.

As used herein, the term "vinyl alcohol" refers to the unit

The vinyl alcohol content of the hydrolyzed ethylene/vinyl ester copolymer depends both on the vinyl ester content of the precursor copolymer and on the degree to which the precursor copolymer is hydrolyzed. Accordingly, hydrolyzed copolymers with the same vinyl alcohol content can be obtained by hydrolyzing different precursors to different degrees of hydrolysis. Of course, the copolymerized ethylene content and the residual copolymerized vinyl ester content in the hydrolyzed ethylene/vinyl ester copolymer will be different in each case. In selecting a precursor ethylene/vinyl ester copolymer, consideration should be given to the fact that the residual vinyl ester content influences the compatibility of the hydrolyzed copolymer and the epoxy resin; the larger the residual vinyl ester content, the greater the tendency to form compatible blends. On the other hand, in order to ensure adequate reaction between the hydrolyzed copolymer and the epoxy resing, the vinyl alcohol content of the copolymer must be 10–70 mole percent. Preferred hydrolyzed ethylene/vinyl ester copolymers are those which are at least 70 percent hydrolyzed and contain about 18–60 mole percent vinyl alcohol.

The epoxy resins useful in the present invention are those which, in an amount of about 1–30 weight percent, will form compatible blends with the hydrolyzed copolymers. Particularly suitable epoxy resins are those obtained as the condensation products of the reaction of epichlorohydrin and dihydric, polyhydric, or polynuclear phenols in alkaline solution. Especially useful are those formed by the condensation of epichlorohydrin and diphenylol-propane. The latter compound is a bis-phenol resulting from the acidic condensation of 2 mols phenol with 1 mole acetone. In general, the epoxy resins which are most useful have an epoxide equivalent weight of about 100–3000 and, preferably, about 200–1300. Epoxy resins having different equivalent weights can be blended together or they may be supplemented, in amounts of generally no greater than about 10 percent by weight, with other compounds such as epoxidized unsaturated fatty acids, epoxidized esters of unsaturated fatty acids with alcohols, and esters of epoxy condensates as referred to above wherein one or more of the hydroxyls is esterified with a fatty acid. A source of epoxy resins is the commercial products sold under the "Epon" trade name of the Shell Chemical Company.

In preparing the composition of the present invention, the epoxy resin is included in the amount of about 1 percent to about 30 percent by weight of the total composition. Compatible blends with useful elongations become increasingly difficult to obtain as the epoxy resin content exceeds about 30 weight percent, while at concentrations of less than about 1 weight percent, the presence of the epoxy resin does not appear to affect either the adhesive or bulk properties of the hydrolyzed ethylene/vinyl ester copolymers. Preferably the epoxy resin is present in an amount of 8–22 weight percent.

The appropriate choice of a particular hydrolyzed copolymer and a particular epoxy resin is influenced by what properties the composition is required to possess. For example, so long as compatibility is achieved, highly solvent resistant and dimensionally stable thermosetting blends are obtained when hydrolyzed ethylene/vinyl ester copolymers having 10–70 mole percent vinyl alcohol are blended with epoxy resins having an epoxide equivalent molecular weight of about 200–1300. Furthermore, these blends generally show an improvement in tensile strength and/or adhesive properties with little decrease in elongation compared to the hydrolyzed copolymer itself. Similar behavior is also found with respect to epoxy resins having high epoxide equivalent weights, i.e., greater than 1300, so long as the mile percent vinyl alcohol in the hydrolyzed copolymer is comparatively low, e.g., about 10–30 percent. With respect to these latter blends it has been found that the adhesive properties, i.e., peel strengths, and lap shear strengths, show an improvement. As the percent vinyl alcohol in the hydrolyzed copolymer increases, blends containing epoxy resins with high epoxide equivalent weights become increasingly more brittle and show somewhat diminishing peel and lap shear strength. However, these blends are quite solvent resistant and dimensionally stable.

The manner in which the present compositions are formulated is not particularly critical and a variety of well known methods, such as melt blending, solvent blending, or powder blending, can be used. With melt blending, the hydrolyzed copolymer and epoxy ingredients are simply blend at a temperature at which both ingredients are molten. A rubber mill or extruder can conveniently be used for this type of blending. The suitability of this method will frequently depend on the temperature at which the blend cures. If, for example, a low temperature curing catalyst is used, melt blending may not be suitable since the composition would cure on blending. In such instances, solvent or powder blending can be used to prepare the composition. Suitable solvents for the present ingredients include lower alcohol-aromatic hydrocarbon mixtures, e.g., 20 percent ethanol in toluene.

As with the method of formulation, the manner in which the present compositions are applied to the substrates to be bonded is not particularly important. Thus, they can be applied in bulk form or as films which have been cast from solution, molded, or extruded. If powder blending is used in formulating, the compositions can be simply applied in that form. After application, firm bonding of the substrates can be accomplished by curing the compositions under heat and pressure. Ordinarily, the compositions can be cured to the desired extent at temperatures and pressures of less than 250° C. and 300 p.s.i., respectively with curing times ranging from about 30 minutes to 2 hours. Curing catalysts for epoxy resins can also be included in the compositions of the present invention in customary amounts, e.g., 0.5–5 weight percent, based on the total composition. Among others, a variety of such catalysts are disclosed in the book titled "Epoxy Resins" written by Irving Skeist and published in 1958 by The Reinhold Publishing Corporation. In addition to catalysts, other ingredients, such as fibrous reinforcing agents (glass, boron, etc.), inorganic fillers, etc., can also be present in the compositions of this invention so long as they do not substantially detract from the basic properties of the hydrolyzed copolymer-epoxy resin blend.

The following examples illustrate compatible compositions of the present invention.

EXAMPLE I

In this example a hydrolyzed copolymer containing about 18 mole percent vinyl alcohol was used. The copolymer was prepared from an ethylene/vinyl acetate precursor copolymer (40 weight percent vinyl acetate- M.I. about 55) by alcoholysis (about 96%) in methanol using a sodium methoxide catalyst. Table 1 presents some of the bulk and adhesive properties of blends of this hydrolyzed copolymer with several epoxy resins. The blends were prepared by rubber milling on a two roll mill at 130° C. for 3 minutes and cured at 200° C. for 90 minutes.

TABLE 1

| Epoxy resin | Percent epoxy in blend | Blend properties | | | | | |
|---|---|---|---|---|---|---|---|
| | | Tensile [1] strength (p.s.i.) | Elongation[1] (percent) | Peel strength [2] lbs./inch | Lap shear [3] (p.s.i.) | | Creep [4] (percent) |
| | | | | | Dry | Steamed (24 hrs.) | |
| "Epon" 1001 [5] | 10 | 5,415 | 390 | 22–24 | 4,500 | 2,600 | 0.05 |
| "Epon" 1001 [5] | 20 | 4,765 | 260 | ([7]) | ([7]) | ([7]) | ([7]) |
| "Epon" 1004 [6] | 20 | 4,960 | 310 | ([7]) | ([7]) | ([7]) | ([7]) |
| Hydrolyzed copolymer alone | | 3,400 | 425 | 2–4 | 2,200 | 1,500 | 1.3 |

[1] On Instron tester, gauge length=0.9 inches, cross head speed=1 inch/minute.
[2] On degreased aluminum sheets with 5 mil glue line thickness cured at 200 p.s.i., 200° C. for 90 min. Instron tester at cross head speed of 2 inches/minute.
[3] On degreased aluminum coupons using a molded (130° C.–30 min.) 10 mil film of blend. Cured at 200 p.s.i., 200° C. for 90 min. Instron tester at cross head speed of 0.02 inch/min.
[4] On Instron tester at 6 p.s.i. and 105° C. for 20 hours.
[5] Epoxide equivalent weight=450–525, hydroxyl equivalent weight=145, melting pt.=64–76° C.
[6] Epoxide equivalent weight=870–1025, hydroxyl equivalent weight=175, melting pt.=95–105° C.
[7] Not measured.

Table 2 illustrates the tensile strength (TS) in p.s.i., and elongation (Elon) in percent of a composition containing the hydrolyzed copolymer of Example I, 10% "Epon" 1001, and various curing catalysts at several different curing times and temperatures.

TABLE 2

| Catalyst | Wt. percent catalyst [1] | 175° C.-30 min. | | 200° C.-60 min. | |
|---|---|---|---|---|---|
| | | (T.S.) | (Elon) | (T.S.) | (Elon) |
| Boron trifluoride monoethyl amine | 1 | 2,655 | 235 | 3,365 | 230 |
| Nadic anhydride | 1 | 3,110 | 345 | 3,665 | 350 |
| Dicyandiamide | 1 | 2,650 | 160 | 3,440 | 275 |
| Dicyandiamide | 0.6 | 2,680 | 170 | 3,425 | 295 |
| Maleic anhydride | 1 | 3,115 | 360 | 4,710 | 360 |
| Hexahydrophthalic anhydride | 1 | 2,900 | 310 | 4,880 | 410 |
| None | None | 2,815 | 340 | 4,735 | 340 |

[1] Based on total weight of composition.

EXAMPLE II

Two compositions were formulated with different epoxy resins in a manner similar to that of Example I. The hydrolyzed ethylene/vinyl acetate copolymers of these compositions contained 47 mole percent vinyl alcohol, 43 mole percent ethylene, and 10 mole percent vinyl acetate.

The compositions of Example II were tested and cured as in Example I, the results of the tests being given in Table 3.

TABLE 3

| Epoxy resin | Percent Epoxy in blend | Blend properties | | | |
|---|---|---|---|---|---|
| | | Tensile Strength (p.s.i.) | Elongation (percent) | Peel strength, lbs./inch | Lap shear (p.s.i.) dry |
| "Epon" 1004 | 10 | 7,000 | 300 | 18 | 3,300 |
| "Epon" 1007 [1] | 20 | 6,400 | 270 | 30 | 4,300 |
| Hydrolyzed copolymer alone | | 6,000 | 400 | 21 | 4,000 |

[1] Epoxide equivalent weight=1,550-2,000, hydroxyl equivalent weight=200, M.P. 125-132° C.

EXAMPLE III

Four compositions (A, B, C, and D) were prepared containing 20 weight percent of "Epon" 828 epoxy resin (epoxide equivalent weight=175-210, hydroxyl equivalent weight=85) and 80 weight percent of a hydrolyzed ethylene/vinyl acetate copolymers containing 47 mole percent vinyl alcohol, 52 mole percent ethylene, and 1 mole percent vinyl acetate. The hydrolyzed copolymer of compositions A and C had a melt index of 25 while the copolymer of compositions B and D had a melt index of 400. Compositions C and D contained 1.4 weight percent dicyandiamide curing catalyst. The compositions were formulated by dissolving the epoxy resin and the hydrolyzed copolymer in a toluene solvent system containing 20 percent ethanol and, thereafter, casting 5 mil films from the solutions.

Table 4 sets forth the adhesive properties, determined in a manner similar to that given in Table 1, of the compositions of this example. The adhesive bonds were formed at 200° C. under 200 p.s.i. pressure for 30 minutes.

TABLE 4

| | Lap shear (p.s.i.) | | Peel (p.l.i.) | |
|---|---|---|---|---|
| | Dry | After 24 hrs. steaming | Dry | After 24 hrs. steaming |
| Composition: | | | | |
| A | 4,300 | 2,600 | 22 | 20 |
| B | 4,300 | 2,600 | 11 | 20 |
| C | 5,700 | 3,200 | 28 | 20 |
| D | 5,000 | 3,500 | 7 | 13 |
| Copolymer of comps. A and C | 5,100 | 3,000 | 16 | 20 |
| Copolymer of comps. B and D | 1,400 | Fail | <1 | |

We claim:
1. A composition essentially comprising a compatible blend of (A) 70–99 weight percent of a hydrolyzed ethylene/vinyl ester copolymer containing 10–70 mole percent vinyl alcohol and respectively (B) 30–1 weight percent of an epoxy resin having more than one 1, 2-epoxide group per molecule and an epoxide equivalent weight of about 200–1300.

2. The composition of claim 1 wherein the vinyl ester is vinyl acetate.

3. The composition of claim 1 wherein the epoxy resin has an epoxide equivalent weight of about 100–3000.

4. The composition of claim 3 wherein the hydrolyzed copolymer is at least 70 percent hydrolyzed and contains about 18–60 mole percent vinyl alcohol and the epoxy resin has an epoxide equivalent weight of about 200–1300.

5. The composition of claim 4 wherein the epoxy resin is formed by the condensation of epichlorohydrin and bisphenol A.

6. The composition of claim 5 wherein the vinyl ester is vinyl acetate.

7. The composition of claim 6 wherein (A) is present in an amount of 78–92 weight percent and (B) is present in an amount of 8–22 weight percent.

8. The composition of claim 1 containing a curing catalyst.

9. A composition consisting of the compatible blend recited in claim 1.

10. The composition of claim 9 containing a curing catalyst.

References Cited

UNITED STATES PATENTS

| 2,884,339 | 4/1959 | Dannenberg | 260—837 |
| 3,227,668 | 1/1966 | Ackerman | 260—28 |
| 3,297,784 | 1/1967 | Snedeker | 260—837 |
| 3,454,418 | 7/1969 | Firsberg | 260—837 |

PAUL LIEBERMAN, Primary Examiner

U.S. Cl. X.R.

260—23, 47, 87.3, 78.4, 837; 161—184, 186